US012649572B2

(12) United States Patent
Bower et al.

(10) Patent No.: US 12,649,572 B2
(45) Date of Patent: *Jun. 9, 2026

(54) VERTICAL TAKE-OFF AND LANDING AIRCRAFT

(71) Applicant: Archer Aviation Inc., San Jose, CA (US)

(72) Inventors: Geoffrey C. Bower, Sunnyvale, CA (US); Thomas P. Muniz, San Jose, CA (US); Brett Adcock, Los Altos Hills, CA (US); Adam Goldstein, New York, NY (US); Calder Richmond Hughes, Portland, OR (US); Zachary Robert Timm Hazen, Portland, OR (US); Chad Stuart Kossar, Hood River, OR (US)

(73) Assignee: Archer Aviation Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/237,885

(22) Filed: Jun. 13, 2025

(65) Prior Publication Data

US 2025/0304252 A1      Oct. 2, 2025

Related U.S. Application Data

(63) Continuation of application No. 17/955,103, filed on Sep. 28, 2022, which is a continuation of application
(Continued)

(51) Int. Cl.
B64C 29/00        (2006.01)
B64C 9/00        (2006.01)
(Continued)

(52) U.S. Cl.
CPC ............ B64C 29/0033 (2013.01); B64C 9/00 (2013.01); B64C 27/54 (2013.01); B64D 27/34 (2024.01); B64D 27/357 (2024.01); B64D 31/16 (2024.01)

(58) Field of Classification Search
CPC ........................ B64C 29/0033; B64C 29/0025
See application file for complete search history.

(56) References Cited

U.S. PATENT DOCUMENTS 2,825,514 A      3/1958   Johann
2,940,691 A      6/1960   Constant, V
(Continued)

FOREIGN PATENT DOCUMENTS

AU        2017200817 A1      8/2017
AU        2016238069 C1      6/2019
(Continued)

OTHER PUBLICATIONS

Extended European Search report dated Jun. 27, 2024, directed to European Application No. 24165177.7; 8 pages.
(Continued)

*Primary Examiner* — Ashesh Dangol
(74) *Attorney, Agent, or Firm* — Finnegan, Henderson, Farabow, Garrett & Dunner LLP

(57)        ABSTRACT

A vertical take-off and landing aircraft includes a fuselage, at least one wing connected to the fuselage, a plurality of rotors connected to the at least one wing for providing lift for vertical take-off and landing of the aircraft and a plurality of proprotors connected to the at least one wing and tiltable between lift configurations for providing lift for vertical take-off and landing of the aircraft and propulsion configurations for providing forward thrust to the aircraft.

27 Claims, 8 Drawing Sheets

Related U.S. Application Data

No. 16/878,380, filed on May 19, 2020, now abandoned.

(51) Int. Cl.

| | |
|---|---|
| *B64C 27/54* | (2006.01) |
| *B64D 27/34* | (2024.01) |
| *B64D 27/357* | (2024.01) |
| *B64D 31/16* | (2024.01) |

(56) References Cited

U.S. PATENT DOCUMENTS

| | | | |
|---|---|---|---|
| 3,059,876 A * | 10/1962 | Platt | B64C 29/0033 |
| | | | 244/7 C |
| 3,081,964 A | 3/1963 | Quenzler | |
| 3,089,666 A | 5/1963 | Quenzler | |
| 3,161,374 A | 12/1964 | Allred et al. | |
| 3,181,810 A | 5/1965 | Olson | |
| 3,389,878 A | 6/1968 | Manfred | |
| 3,515,500 A | 6/1970 | Nachod | |
| 3,889,902 A | 6/1975 | Madet | |
| 4,828,203 A | 5/1989 | Clifton et al. | |
| 5,419,514 A | 5/1995 | Ducan | |
| 5,823,468 A | 10/1998 | Bothe | |
| 5,890,441 A | 4/1999 | Swinson et al. | |
| 6,184,656 B1 | 2/2001 | Karunasiri et al. | |
| 6,293,491 B1 | 9/2001 | Wobben | |
| 6,457,672 B1 | 10/2002 | Tai | |
| 6,655,631 B2 | 12/2003 | Austen-Brown | |
| 6,892,980 B2 | 5/2005 | Kawai | |
| 7,159,817 B2 | 1/2007 | VanderMey et al. | |
| 7,874,513 B1 | 1/2011 | Smith | |
| 8,123,460 B2 | 2/2012 | Collette | |
| 8,128,033 B2 | 3/2012 | Raposo | |
| 8,129,951 B2 | 3/2012 | Turner et al. | |
| 8,174,238 B2 | 5/2012 | Badger | |
| 8,471,529 B2 | 6/2013 | Vance et al. | |
| 8,485,464 B2 | 7/2013 | Kroo | |
| 8,487,558 B2 | 7/2013 | Ogawa et al. | |
| 8,552,686 B2 | 10/2013 | Jung et al. | |
| 8,707,721 B2 | 4/2014 | Scherer et al. | |
| 8,733,690 B2 | 5/2014 | Bevirt et al. | |
| 8,777,150 B2 | 7/2014 | Wang | |
| 8,829,742 B2 | 9/2014 | Wu et al. | |
| 9,160,264 B2 | 10/2015 | Hu | |
| 9,172,120 B2 | 10/2015 | Pariseau et al. | |
| 9,187,174 B2 | 11/2015 | Shaw | |
| 9,266,607 B2 | 2/2016 | Fink et al. | |
| 9,296,477 B1 | 3/2016 | Coburn | |
| 9,321,368 B2 | 4/2016 | Yang et al. | |
| 9,377,784 B2 | 6/2016 | Kowalski et al. | |
| 9,437,850 B2 | 9/2016 | Brockman et al. | |
| 9,493,090 B2 | 11/2016 | Timmons et al. | |
| 9,567,088 B2 | 2/2017 | Godlasky et al. | |
| 9,601,812 B2 | 3/2017 | Namou et al. | |
| 9,616,766 B2 | 4/2017 | Fujii | |
| 9,643,720 B2 | 5/2017 | Hesselbarth | |
| 9,673,431 B2 | 6/2017 | Despesse | |
| 9,705,438 B2 | 7/2017 | Zhao et al. | |
| 9,713,961 B2 | 7/2017 | Fan et al. | |
| 9,764,833 B1 | 9/2017 | Tighe et al. | |
| 9,783,037 B2 | 10/2017 | Muto et al. | |
| 9,783,288 B1 | 10/2017 | Moore et al. | |
| 9,789,782 B2 | 10/2017 | Holgers et al. | |
| 9,840,161 B2 | 12/2017 | Chikkannanavar et al. | |
| 9,960,458 B2 | 5/2018 | Weicker et al. | |
| 10,029,785 B2 | 7/2018 | Niedzballa | |
| 10,040,363 B2 | 8/2018 | Beaston et al. | |
| 10,056,767 B2 | 8/2018 | Troberg et al. | |
| 10,110,033 B1 | 10/2018 | Hom et al. | |
| 10,118,695 B2 | 11/2018 | Thomassin et al. | |
| 10,124,890 B2 | 11/2018 | Sada-Salinas et al. | |
| 10,128,674 B2 | 11/2018 | Nelson | |
| 10,131,426 B2 | 11/2018 | Judas et al. | |
| 10,138,899 B2 | 11/2018 | Joubert et al. | |
| 10,144,507 B2 | 12/2018 | Chretien | |
| 10,162,367 B2 | 12/2018 | Douglas et al. | |
| 10,179,519 B2 | 1/2019 | Schmidt | |
| 10,189,565 B2 | 1/2019 | Patterson et al. | |
| 10,298,026 B2 | 5/2019 | Trimboli et al. | |
| D850,357 S | 6/2019 | Cummings | |
| 10,317,914 B2 | 6/2019 | Douglas et al. | |
| 10,322,796 B2 | 6/2019 | Lee | |
| 10,322,814 B1 | 6/2019 | Tian | |
| 10,351,236 B1 | 7/2019 | Woodworth et al. | |
| 10,364,036 B2 | 7/2019 | Tighe et al. | |
| 10,472,058 B2 | 11/2019 | Tian | |
| 10,494,088 B1 | 12/2019 | Coralic et al. | |
| 10,501,173 B1 | 12/2019 | Douglas et al. | |
| 10,518,875 B2 | 12/2019 | Judas et al. | |
| 10,526,083 B2 | 1/2020 | Shaw | |
| D875,022 S | 2/2020 | Cummings | |
| 10,559,861 B2 | 2/2020 | Zheng et al. | |
| 10,608,505 B1 | 3/2020 | Long et al. | |
| 10,625,870 B1 | 4/2020 | Melack et al. | |
| 10,649,468 B2 | 5/2020 | Cutler et al. | |
| 10,752,350 B2 | 8/2020 | Mccullough et al. | |
| 10,870,485 B2 | 12/2020 | Reichert et al. | |
| 10,914,789 B2 | 2/2021 | Lemkin et al. | |
| 11,072,423 B1 | 7/2021 | Robertson et al. | |
| 11,465,737 B1 * | 10/2022 | McDonald | B64C 27/50 |
| 11,643,200 B2 | 5/2023 | Lee et al. | |
| 12,006,033 B1 | 6/2024 | Villa et al. | |
| 2003/0094537 A1 | 5/2003 | Austen-Brown | |
| 2004/0107013 A1 | 6/2004 | Fuller et al. | |
| 2005/0230524 A1 | 10/2005 | Ishiba | |
| 2006/0032970 A1 | 2/2006 | Allen | |
| 2007/0057113 A1 | 3/2007 | Parks | |
| 2007/0158494 A1 | 7/2007 | Burrage | |
| 2007/0221780 A1 | 9/2007 | Builta | |
| 2009/0251100 A1 | 10/2009 | Incledon et al. | |
| 2009/0286149 A1 | 11/2009 | Ci et al. | |
| 2010/0001120 A1 | 1/2010 | Sun | |
| 2010/0136390 A1 | 6/2010 | Ueda et al. | |
| 2010/0301168 A1 | 12/2010 | Raposo | |
| 2011/0036938 A1 | 2/2011 | Blomeley | |
| 2011/0315809 A1 | 12/2011 | Oliver | |
| 2012/0091257 A1 | 4/2012 | Wolff et al. | |
| 2012/0261523 A1 | 10/2012 | Shaw | |
| 2013/0020429 A1 * | 1/2013 | Kroo | B64C 39/12 |
| | | | 244/6 |
| 2013/0026305 A1 | 1/2013 | Wang | |
| 2013/0062455 A1 | 3/2013 | Lugg et al. | |
| 2013/0069594 A1 | 3/2013 | Jung | |
| 2013/0126680 A1 | 5/2013 | Hamke et al. | |
| 2013/0311008 A1 | 11/2013 | Kroo | |
| 2014/0125284 A1 | 5/2014 | Qahouq | |
| 2015/0014475 A1 | 1/2015 | Taylor et al. | |
| 2015/0136897 A1 | 5/2015 | Seibel et al. | |
| 2015/0175260 A1 | 6/2015 | Hesselbarth | |
| 2015/0266571 A1 | 9/2015 | Bevirt et al. | |
| 2015/0344134 A1 | 12/2015 | Cruz Ayoroa | |
| 2015/0360775 A1 | 12/2015 | Arai | |
| 2016/0023527 A1 | 1/2016 | Dietrich | |
| 2016/0031555 A1 | 2/2016 | Bevirt et al. | |
| 2016/0031556 A1 | 2/2016 | Bevirt et al. | |
| 2016/0115864 A1 | 4/2016 | Campbell et al. | |
| 2016/0134160 A1 | 5/2016 | Schultz et al. | |
| 2016/0207625 A1 | 7/2016 | Judas et al. | |
| 2016/0241058 A1 | 8/2016 | Carralero et al. | |
| 2016/0244158 A1 | 8/2016 | Fredericks et al. | |
| 2016/0288903 A1 | 10/2016 | Rothhaar et al. | |
| 2016/0297520 A1 | 10/2016 | Sada-Salinas et al. | |
| 2016/0336623 A1 | 11/2016 | Nayar et al. | |
| 2016/0340035 A1 | 11/2016 | Duru | |
| 2016/0347447 A1 | 12/2016 | Judas et al. | |
| 2017/0240273 A1 | 8/2017 | Yuen | |
| 2017/0301907 A1 | 10/2017 | Park et al. | |
| 2018/0043789 A1 | 2/2018 | Goetz | |
| 2018/0057155 A1 * | 3/2018 | Reichert | B64C 35/00 |
| 2018/0105267 A1 * | 4/2018 | Tighe | B64C 27/08 |
| 2018/0105268 A1 | 4/2018 | Tighe et al. | |
| 2018/0105279 A1 | 4/2018 | Tighe et al. | |
| 2018/0162525 A1 | 6/2018 | St. Clair et al. | |

(56) References Cited

U.S. PATENT DOCUMENTS

| | | | |
|---|---|---|---|
| 2018/0215464 A1 | 8/2018 | Vetter et al. | |
| 2018/0215465 A1 | 8/2018 | Renteria | |
| 2018/0346108 A1 | 12/2018 | Sheng et al. | |
| 2018/0362154 A1 | 12/2018 | Louis et al. | |
| 2018/0370629 A1 | 12/2018 | Finlay et al. | |
| 2019/0009895 A1 | 1/2019 | Tu | |
| 2019/0061901 A1 | 2/2019 | Long | |
| 2019/0092461 A1 | 3/2019 | Duffy et al. | |
| 2019/0100313 A1 | 4/2019 | Campbell | |
| 2019/0127056 A1 | 5/2019 | Weekes et al. | |
| 2019/0135408 A1 | 5/2019 | Moore et al. | |
| 2019/0135424 A1 | 5/2019 | Baity et al. | |
| 2019/0135425 A1 | 5/2019 | Moore et al. | |
| 2019/0144126 A1 | 5/2019 | Groninga et al. | |
| 2019/0229541 A1 | 7/2019 | Ono | |
| 2019/0255967 A1 | 8/2019 | Doersam et al. | |
| 2019/0256194 A1 | 8/2019 | Vander Lind et al. | |
| 2019/0291862 A1 | 9/2019 | Lyasoff et al. | |
| 2019/0329882 A1 | 10/2019 | Baity | |
| 2020/0140079 A1 | 5/2020 | Campbell | |
| 2020/0164972 A1 | 5/2020 | Kiesewetter et al. | |
| 2020/0164974 A1 | 5/2020 | Parks | |
| 2020/0239134 A1 | 7/2020 | Robertson et al. | |
| 2020/0269975 A1 | 8/2020 | Fink et al. | |
| 2020/0290742 A1 | 9/2020 | Kumar et al. | |
| 2020/0354049 A1 | 11/2020 | Noppel et al. | |
| 2020/0391861 A1* | 12/2020 | Groninga | B64C 29/0033 |
| 2020/0391862 A1 | 12/2020 | Groninga et al. | |
| 2020/0407060 A1 | 12/2020 | Hosseini | |
| 2021/0016877 A1 | 1/2021 | Hohenthal | |
| 2021/0031910 A1 | 2/2021 | Cornes | |
| 2021/0094685 A1 | 4/2021 | Klemen | |
| 2021/0107620 A1 | 4/2021 | Weekes et al. | |
| 2021/0107667 A1 | 4/2021 | Sinha et al. | |
| 2021/0206487 A1 | 7/2021 | Iqbal et al. | |
| 2021/0253234 A1* | 8/2021 | Tao | B64C 27/26 |
| 2021/0300527 A1 | 9/2021 | Thalheimer | |
| 2021/0403154 A1* | 12/2021 | Tighe | B64C 29/0033 |
| 2022/0009626 A1 | 1/2022 | Baharav et al. | |
| 2022/0127011 A1 | 4/2022 | Long et al. | |
| 2022/0234747 A1 | 7/2022 | Bower et al. | |
| 2022/0250742 A1 | 8/2022 | Bower | |
| 2024/0308655 A1 | 9/2024 | Villa | |

FOREIGN PATENT DOCUMENTS

| | | |
|---|---|---|
| CN | 202244078 U | 5/2012 |
| CN | 203681869 U | 7/2014 |
| CN | 104364154 A | 2/2015 |
| CN | 204642150 U | 9/2015 |
| CN | 204701770 U | 10/2015 |
| CN | 105292454 A | 2/2016 |
| CN | 105292468 A | 2/2016 |
| CN | 205098473 U | 3/2016 |
| CN | 105480416 A | 4/2016 |
| CN | 105539835 A | 5/2016 |
| CN | 205293091 U | 6/2016 |
| CN | 103796917 B | 7/2016 |
| CN | 104802985 B | 1/2017 |
| CN | 106864747 A | 6/2017 |
| CN | 105460210 B | 8/2018 |
| CN | 108528704 A | 9/2018 |
| CN | 108860582 A | 11/2018 |
| CN | 109131865 A | 1/2019 |
| CN | 109263934 A | 1/2019 |
| CN | 109305355 A | 2/2019 |
| CN | 106864747 B | 5/2019 |
| CN | 109843715 A | 6/2019 |
| CN | 109969392 A | 7/2019 |
| CN | 110450948 A | 11/2019 |
| CN | 106573678 B | 4/2021 |
| CN | 110035954 B | 9/2022 |
| CN | 109720564 B | 11/2024 |
| DE | 1080860 B | 4/1960 |
| DE | 1406514 A1 | 10/1968 |
| DE | 1406518 A1 | 1/1969 |
| DE | 19745492 B4 | 6/2005 |
| DE | 202014004877 U1 | 7/2014 |
| DE | 102014000509 A1 | 7/2015 |
| DE | 102017118965 A1 | 2/2019 |
| DE | 102017122359 A1 | 3/2019 |
| EP | 2776315 B1 | 4/2016 |
| EP | 3038913 B1 | 4/2019 |
| EP | 3251882 B1 | 4/2019 |
| EP | 3466812 A1 | 4/2019 |
| EP | 3597528 A1 | 1/2020 |
| EP | 3868660 A1 | 8/2021 |
| GB | 410747 A | 5/1934 |
| GB | 935715 A | 9/1963 |
| GB | 935884 A | 9/1963 |
| GB | 2545700 A | 6/2017 |
| JP | 2010183671 A | 8/2010 |
| JP | 2015180563 A | 10/2015 |
| JP | 2015180564 A | 10/2015 |
| KR | 20160116736 A | 10/2016 |
| KR | 102179828 B1 | 11/2020 |
| RU | 2448869 C1 | 4/2012 |
| RU | 127365 U1 | 4/2013 |
| RU | 2657706 C1 | 6/2018 |
| WO | 2012133706 A1 | 10/2012 |
| WO | 2014058351 A2 | 4/2014 |
| WO | 2015143093 A2 | 9/2015 |
| WO | 2017109500 A1 | 6/2017 |
| WO | 2018064209 A1 | 4/2018 |
| WO | 2018075412 A1 | 4/2018 |
| WO | 2018130020 A1 | 7/2018 |
| WO | 2019034765 A1 | 2/2019 |
| WO | 2019041383 A1 | 3/2019 |
| WO | 2019202325 A1 | 10/2019 |
| WO | 2019211875 A1 | 11/2019 |
| WO | 2020058706 A1 | 3/2020 |
| WO | 2020169940 A1 | 8/2020 |
| WO | 2021155208 A1 | 8/2021 |

OTHER PUBLICATIONS

Extended European Search Report dated Jun. 27, 2024, directed to European Application No. 24165237.9; 8 pages.

First Office Action dated Jul. 10, 2024, directed to Chinese Application No. 2024102075824; 8 pages.

Notice for Eligibility of Grant dated May 20, 2024, directed to Singapore Application No. 11202260322R; 4 pages.

Notice of Reasons for Refusal dated Apr. 5, 2024, directed to Japanese Application No. 2022-571211; 8 pages.

Requisition by the Examiner dated Feb. 27, 2024, directed to Canadian Application No. 3,183,903; 5 pages.

Hyundai Motor, Uber Urban Air Mobility Vehicle, (Viewed on Internet Feb. 21, 2025), URL: https://www.youtube.com/watch?v=ZIs2xmdTqHg, Published Jan. 8, 2020.

Niemiec et al., "Effect of Rotor Cant on Trim and Autonomous Flight Dynamics of a Quadcopter", AHS International 74th Annual Forum & Technology Display, May 14-17, 2018, pp. 1-14.

"Tiltrotor", Wikipedia, Mar. 4, 2020, https://web.archive.org/web/20200415003449/https://en.wikipedia.org/wiki/Tiltrotor, pp. 1-7.

Korea Aerospace Research Institute, "UAV R&D", Korea Aerospace Research Institute, pp. 1-10.

Kim et al., "Structural Sizing for Optionally Piloted PAV Preliminary Design", Journal of the Korean Society for Aviation and Aeronautics, 2020, 28(1), pp. 83-89.

CFR 25.905, https://www.ecfr.gov/on/2019-12-31/title-14/chapter-1/subchapter-C/part-25/subpart-E/subject-group•ECFR3db216ad9d52259/section-25.905, National Archives and Records Administration, Dec. 31, 2019.

Decision ED 2003/12/RM, https://www.easa.europa.eu/en/document-library/agency-decisions/ed-decision-2003012rm, The European Aviation Safety Agency, Nov. 5, 2003, pp. 1-136.

(Jan. 20, 2013). "It's a Quad . . . il's a Plane . . . ll's a SuperSchizoQuadPlane!" located at https://www.youtube.com/watch?v=8HQT4XsZBRo&I=2s, visited on Apr. 7, 2021. (5 pages).

(56) References Cited

OTHER PUBLICATIONS

Bower et al., U.S. Appl. No. 29/866,698, filed Sep. 23, 2022 for "Vertical Take-Off and Landing Aircraft." [A ::opy is not submitted herewith pursuant to the waiver of 37 C.F.R. § 1.98(a)(2)(iii) issued by the Office on Sep. 21, 2004.].

Bower et al., U.S. Office Action mailed Mar. 29, 2022, directed to U.S. App. No. 16/878,380; 12 pages.

Bower, U.S. Office Action mailed Dec. 6, 2022, directed to U.S. Appl. No. 17/170,242; 21 pages.

Bower, U.S. Office Action mailed Jul. 29, 2022, directed to U.S. Appl. No. 17/170,242; 13 pages.

Byun et al. (Oct. 2014). "Design and Fabrication of a Scaled-Down Unmanned Quad-Tilt-Prop Personal Air Vehicle," Journal of Aerospace Engineering: pp. 1-15.

Exhibit 1002, File History of U.S. Appl. No. 17/955,103, entitled "Vertical Take-off and Landing Aircraft," lled Sep. 28, 2022, Case No. DER2023-00007; 77 pages.

Exhibit 1003, Declaration of Brett Adcock in Support of Defendant's Opposition to Plaintiffs Motion for Preliminary injunction and Expedited Discovery dated Jun. 23, 2021, Filed in *Wisk Aero LLC v. Archer Aviation Inc.*, Case No. 3:21-CV-02450-WHO, Case No. DER2023-00007; 29 pages.

Exhibit 1004, Declaration of Calder Hughes dated Jun. 21, 2021, Filed in *Wisk Aero LLC v. Archer Aviation Inc.*, Case No. 3:21-CV-02450-WHO, Case No. DER2023-00007; 14 pages.

Exhibit 1005, Exhibit E to Declaration of Calder Hughes dated Jun. 21, 2021 (Ex. 1004), Case No. DER2023-00007; 15 pages.

Exhibit 1006, Exhibit F to Declaration of Calder Hughes dated Jun. 21, 2021 (Ex. 1004 ), Case No. DER2023-00007; 11 pages.

Exhibit 1007, Declaration of Adam Goldstein in Support of Defendant's Opposition to Plaintiffs Motion for Preliminary injunction and Expedited Discovery dated Jun. 23, 2021, Filed in *Wisk Aero LLC v. Archer Aviation Inc.*, Case No. 3:21-CV-02450-WHO, Case No. DER2023-00007; 11 pages.

Exhibit 1008, Supplemental Declaration of Geoff Long in Support of Wisk Aero LLC's Motion for Preliminary Injunction and Expedited Discovery dated Jul. 2, 2021, Filed in *Wisk Aero LLC v. Archer Aviation Inc.*, Case No. 3:21-CV-02450-NHO; Case No. DER2023-00007; 5 pages.

Exhibit 1009, Transcript of Deposition of Brett Adcock dated Jun. 28, 2021, Filed in *Wisk Aero LLC v. Archer Aviation nc.*, Case No. 3:21-CV-02450-WHO, Case No. DER2023-00007; 180 pages.

Exhibit 1010, Transcript of Deposition of Geoff Long dated Jun. 16, 2021, Filed in *Wisk Aero LLC v. Archer Aviation nc.*, Case No. 3:21-CV-02450-WHO, Case No. DER2023-00007; 101 pages.

Exhibit 1011, Transcript of Deposition of James Tighe dated Jun. 17, 2021, Filed in *Wisk Aero LLC v. Archer Aviation nc.*, Case No. 3:21-CV-02450-WHO, Case No. DER2023-00007; 75 pages.

Exhibit 1012, Exhibit A to Declaration of Geoff Long dated Jul. 2, 2021 (Ex. 1008), Case No. DER2023-00007; 1 page.

Exhibit 1013, Complaint and Demand for Jury Trial dated Apr. 6, 2021, Filed in *Wisk Aero LLC v. Archer Aviation Inc.*, ::ase No. 3:21-CV-02450-WHO, Case No. DER2023-00007; 73 pages.

Exhibit 1014, Transcript of Deposition of Thomas P. Muniz taken Jun. 25, 2021, Filed in *Wisk Aero LLC v. Archer I\viation Inc.*, Case No. 3:21-CV-02450-WHO, Case No. DER2023-00007; 8 pages.

Exhibit 1015, Declaration of Calder Hughes in Support of Petition to Institute Derivation Proceeding dated Nov. 30, 2022, Case No. DER2023-00007; 3 pages.

Exhibit 1016, Declaration of Adam Goldstein in Support of Petition to Institute Derivation Proceeding dated Dec. 2, 2022, Case No. DER2023-00007; 3 pages.

Exhibit 1017, Declaration of James Wang in Support of Petition to Institute Derivation Proceeding dated Dec. 28, J022, Case No. DER2023-00007; 29 pages.

Exhibit 1018, James Wang's curriculum vitae, Case No. DER2023-00007; 2 pages.

Exhibit 1019, Textbook by Daniel P. Raymer, entitled "Aircraft Design: A Conceptual Approach, 2nd Edition," published 1992, Case No. DER2023-00007; 392 pages.

Exhibit 1029, List of Patents and Patent Applications Filed by Wisk Aero LLC, Case No. DER2023-00007; 5 pages.

International Search Report and Written Opinion mailed May 3, 2022, directed to International Application No. PCT/US2022/070545; 16 pages.

International Search Report and Written Opinion mailed Sep. 1, 2021, directed to International Application No. PCT/US2021/032874; 20 pages.

Joby Aviation. {Oct. 1, 2020), localed at https://web.archive.org/web/20201001151016/https://www.jobyaviation. ::om/, visited on Apr. 7, 2021. (5 pages).

Kitty Hawk 2020. {Oct. 22, 2020), localed at https://web.archive.org/web/20201022210104/htlps://kittyhawk.aero/heaviside/, visited on Apr. 7, 2021. (5 pages).

Petition to Institute Derivation Proceeding of U.S. Appl. No. 17/162,313, by Archer Aviation Inc., U.S. Appl. No. 17/955,103, Case No. DER2023-00007, Dec. 29, 2022; 58 pages.

Staruk et al. "Control and Stability Characteristics of Gamera II: A Human Powered Helicopter," American Helicopter Society 69th Annual Forum, May 21-23, 2013, Phoenix, Arizona; pp. 1-12.

u/Walchung. (Nov. 3, 2020) "Curtis-Wright Model 300 VTOL transport. Il was intended to serve as a local commuter plane to shuttle passengers from city centers to outlying airports . Designed in the early '60s as an expanded version of the X-19 quad tiltrotor, the failure of that program scuppered Il further development," located as at an www.reddit.com, 3 pages.

33 Wisk Aero LLC. (Oct. 31, 2020) "Meet Cora—Wisk," located at https://web.archive.org/web/20201031013303/https:/wisk.aero/cora/, visited on Apr. 7, 2021. (9 pages).

CTEK. (Nov. 2017). "Battery Charger MUL TI XS 25000, XS 25000 Multi XT 14000, XT 14000," located at: https://docs.rs-online.com/15d2/0900766b81335f57 .pdf; 8 pages.

OrionBMS. (Jun. 25, 2018). "Strings, Parallel Cells, and Parallel Strings," located at: https://www.orionbms.com/manuals/pdf/parallel_strings.pdf; 17 pages.

(2017). "Bell Boeing V-22 Osprey: One Aircraft—Multiple Missions," A New Era in Vertical Flight. (2 pages).

Airbus. (Feb. 2, 2018). "Vahana, the Self-Piloted, eVTOL aircraft from A3 by Airbus, Successfully Completes First FullScale Test Flight": 3 pages.

Analog Devices. (2011). "Lithium Ion Battery Monitoring System," AD7280A: 48 pages.

Andrea. (2010). "Battery Management Systems for Large Lithium-Ion Battery Packs," Artech House: 303 pages.

Archer Aviation Inc.'s Invalidity Contentions dated Oct. 11, 2021, Filed in *Wisk Aero LLC v. Archer Aviation Inc.*, Case No. 3:21-CV-02450-WHO, 42 pages.

Arcturus UAV. (Aug. 11, 2017). "Arcturus Complete VTOL C4ISR Solution," Jump: 2 pages.

Bertorelli. (Apr. 26, 2014). "Airbus Announces Electric Aircraft": 1 page.

Bodson et al. (Aug. 10, 2009). "Control Allocation with Load Balancing," American Institute of Aeronautics and Astronautics: 13 pages.

Bordignon. (Dec. 19, 1996). "Constrained Control Allocation for Systems with Redundant Control Effectors": 260 pages.

Chin et al. "Battery Evaluation Profiles for X-57 and Future Urban Electric Aircraft," AIM/IEEE Electric Aircraft Technologies Symposium (EATS), New Orleans, Louisiana, Aug. 26-28, 2020: 12 pages.

Chin et al. (2019). "Battery Performance Modeling on Maxwell X-57," American Institute of Aeronautics and Astronautics: 15 pages.

Clarke et al. "X-57 Power and Command System Design," IEEE Transportation Electrification Conference and Expo (ITEC), Chicago, Illinois, Jun. 22-24, 2017; 8 pages.

Cobb. (Jul. 2017). "Four-Seat Sun Flyer in the Works," AOPA: 3 pages.

De et al. "Low Inductance Axial Flux BLOC Motor Drive for More Electric Aircraft," 2011 Aerospace Conference, Big Sky, Montana, Mar. 5-12, 2011: pp. 1-11.

(56)          References Cited

OTHER PUBLICATIONS

Delong et al. (2001). "AS 15531/MIL-STD-1553B Digital Time Division Command/Response Multiplex Data Bus," The Avionics Handbook: 29 pages.
Elithion. (Oct. 2011 ). "Li-Ion BMS Cell-Board Processor," Lithiumate EL01: 14 pages.
Elithion. (Oct. 2011 ). "Li-Ion BMS Controller Processor," Lithiumate EL02: 9 pages.
EZGO Company. (2017). "Owner's Guide : RXV Elite Freedom": 60 pages.
Grady. (Apr. 14, 2015). "Pipistrel Introduces Alpha Electro": 1 page.
Harbin Guantuo Power Equipment Co. Ltd. (Jul. 22, 2009). "Lithium Power BMS Manual—GTBMS005A-MC8": 12 pages.
Harkegard. "Efficient Active Set Algorithms for Solving Constrained Least Squares Problems in Aircraft Control Allocation," Proceedings of the 41st IEEE Conference on Decision and Control, Las Vegas, Nevada, Dec. 10-13, 2002: 25 pages.
Head. (Dec. 5, 2019). "EPS aims to become 'household name' in electric aviation," eVTOL, located at https://evtol.com/features/eps-powering-electric-aviation-renaissance/; 4 pages.
Hsu et al. "Balancing Charge/Discharge Management for Series/Parallel Battery Packs," 7th IEEE Conference on Industrial Electronics and Applications (ICIEA), Singapore, Jul. 18-20, 2012, pp. 613-618.
Huber. (Jul. 26, 2017). "Electric Sun Flyer Plans Fall First Flight," located at https://www.ainonline.com/aviationnews/general-aviation/2017-07-26/electric-sun-flyer-plans-fal 1-first-flight; 2 pages.
Ivler et al. "Evaluation of Control Allocation Techniques for a Medium Lift Tilt-Rotor," AHS 71st Annual Forum, May 5-7, 2015; pp. 1-20.
Johansen et al. (Nov. 2, 2012). "Control Allocation—A Survey": 22 pages.
Kahe. (2018). "Triple—Triple Redundant Reliable Onboard Computer Based on Multicore Microcontrollers," International Journal of Reliability, Risk and Safety: Theory and Application 1(1): pp. 17-24.
Kellermann et al. (Dec. 2020). "Design and Optimization of Ram Air-Based Thermal Management Systems for Hybrid-Electric Aircraft," Aerospace 8(3): 1-21.
Kokam. (Mar. 2021 ). "35MW/11 MWh ESS Project in Western Australia": 16 pages.
Leonardo Helicopters Division. (2021 ). "AW609 Tiltrotor": 5 pages.
Liu et al. (Mar. 2017). "A Fast-Charging Switching-Based Charger With Adaptive Hybrid Duty Cycle Control for Multiple Batteries," IEEE Transactions on Power Electronics 32(3): 1975-1983.
Mcswain et al. (Nov. 2017). "Greased Lightning (GL-10) Performance Flight Research—Flight Data Report," NASA: 79 pages.
Merheb et al. "Active Fault Tolerant Control of Octorotor UAV using Dynamic Control Allocation," The 2014 International Conference on Intelligent Unmanned systems (ICIUS'14), Montreal, Canada, Sep. 29-Oct. 1, 2014: 6 pages.
Moore. (Nov-Dec. 2014). "The Joby S2 VTOL Concept : Exploring the New Degrees of Design Freedom of Distrusted Electric Propulsion," Vertiflite 3 pages.
NASA. (Dec. 13, 2017). "X-57 Battery System Survives Flight-Condition, Thermal Runaway Testing," located at https://www.nasa.gov/centers/armstrong/feature/X-57 battery_major_milestone.html; 3 pages.
NASA. (Jun. 17, 2016). "This Week@ NASA": 2 pages.
Niles. (Aug. 24, 2014). "Pipistrel Flies WATTsUP Electric Trainer": 2 pages.
Office Action dated Jan. 2, 2024, directed to EP Application No. 21731 648.8; 5 pages.
Office Action dated Nov. 16, 2023, directed to EP Application No. 21 731 648.8; 5 pages.
Oppenheimer et al. (2011). "Control Allocation" in Control System Applications, CRC Press, Chapter 8: 24 pages.

Pipisrel. (Oct. 2017). "Pipistrel Alpha Electro Information Pack," Revision 05: 23 pages.
Pipistrel Aircraft. (2018). "WATTsUP, the new 2-seat electric trainer," located at http://web.archive.org/web/20180501012427 /http://www.pipistrel.si:80/news/wattsup-the-new-2seat-electric-trainer-took; 2 pages.
Quackenbush et al. "Analysis of Rotor/Airframe Interaction in Hover and Near-Hover Flight Conditions," AIM SciTech 2019 Forum, San Diego, California, Jan. 7-11, 2019: pp. 1-17.
Rapoport. (Apr. 1, 2017). "Airbus Pivots Electric Aircraft Plans": 1 page.
RTCA Inc. (Dec. 2017). "Minimum Operational Performance Standards for Rechargeable Lithium Batteries and Battery Systems": 94 pages.
RTCA Inc. (Mar. 2008). "Minimum Operational Performance Standards for Rechargeable Lithium Battery Systems": 70 pages.
Sasaki et al. "A Statistical Method for Analyzing Lifetime of a Battery Pack," IEEE Power & Energy Society General Meeting, Denver, Colorado, Jul. 26-30, 2015: 5 pages.
Schnulo et al. (Aug. 2019). "Further Development of the NASAX-57 Maxwell Mission Planning Tool for Mods 11, 111, and IV," American Institute of Aeronautics and Astronautics: pp. 1-14.
Silva et al. "VTOL Urban Air Mobility Concept Vehicles for Technology Development," Aviation Technology, Integration, and Operations Conference, Atlanta, Georgia, Jun. 25-29, 2018: pp. 1-16.
Stoll et al. "Conceptual Design of the Joby S2 Electric VTOL PAV," Aviation Technology, Integration, and Operations Conference, Atlanta, Georgia, Jun. 16-20, 2014: 6 pages.
Szondy. (Apr. 30, 2014). "E-Fan Electric Aircraft makes First Public Flight": 4 pages.
Valence—advanced energy systems. (Nov. 2011 ). "LI-Charge XP Rev 2 User Manual," Document Version 4.8: 61 pages.
Vegh et al. "Current Capabilities and Challenges of NDARC and SUAVE for eVTOL Aircraft Design and Analysis," 2019 AIAA/IEEE Electric Aircraft Technologies Symposium (EATS), Indianapolis, Indiana, Aug. 19-22, 2019: pp. 1-20.
Vertical Flight Society. (2021 ). "XTI Aircraft TriFan 600," Electric VTOL News: 11 pages.
Vertical Flight Society. (May 8, 2019). "XTI TriFan 665 flies!", Electric VTOL News: 8 pages.
Weeden et al. (Oct. 1998). "Making Better Use of Parallel Battery Strings at Solar Sites by the Inclusion of a Simple Monitoring Module," IEEE, Intelec—Twentieth International Telecommunications Energy: pp. 204-209.
Wisk Aero LLC. (Dec. 27, 2018). "A Year Gone By. 365 Days of Endless Traffic," located at https://wisk.aero/news/blog/365-days/; 6 pages.
Yoney. (Feb. 25, 2011 ). "Pipistrel Taurus Electro G2 takes to the Skies, Goes on Sale": 5 pages.
Young et al. "Simulated Rotor Wake Interactions Resulting from Civil Tiltrotor Aircraft Operations Near Vertiport Terminals," 51 st AIM Aerospace Sciences Meeting including the New Horizons Forum and Aerospace Exposition, Grapevine, Texas, Jan. 7-10, 2013: pp. 1-26.
Zhou et al. "Reconfigurable Control Allocation Technology Using Weighted Least Squares for Nonlinear System in Unmanned Aerial Vehicle," 48th AIM Aerospace Sciences Meeting, Orlando, Florida, Jan. 4-7, 2010: 11 pages.
Communication under Rule 71(3) EPC dated Feb. 14, 2024, directed to European Application No. 201731648.8, 32 pages.
Examination report No. 1 for standard patent application dated Mar. 22, 2024, directed to Australian Application No. 2021276318; 4 pages.
Examination report No. 2 for standard patent application dated Jul. 2, 2024, directed to Australian Application No. 2021276318; 4 pages.
Extended European Search Report dated Jul. 5, 2024, directed to European Application No. 24165225.4; 8 pages.
Extended European Search Report dated Jul. 5, 2024, directed to European Application No. 24165244.5; 9 pages.
Choi, Sungwook; "Configuration Design and Performance Analysis for the OPPAV", Korean Aerospace Society 2019 Fall Meeting, Nov. 21, 2019.

(56) References Cited

OTHER PUBLICATIONS

Choi, Sungwook; "Geometry Design and Performance Analysis of Electric-powered Vertical Takeoff and Landing Personal Aircraft", Korean Aerospace Society 2019 Fall Meeting, Nov. 2019.

Johnson, Jeffrey L. et al., "Tilt Rotor Aeroacoustic Model Project", Jun. 1999.

Rosenstein, Harold et al., "Aerodynamic Development of the V-22 Tilt Rotor", Aircraft Systems, Design and Technology Meeting, Sep. 1986.

Airbus A400M Atlas. May 9, 2020. Available at: https://web.archive.org/web/20200509054509/https://en.wikipedia.org/wiki/Airbus_A400M_Atlas (6 pages).

Autonomous Flying Personal Aircraft, Flying with Proprietary Technology. Oct. 16, 2019. Available at: https://www.segye.com/newsView/20191016513756 (5 pages).

Configuration Design and Performance Analysis for the OPPAV. Nov. 21, 2019. Presentation delivered by Korea Aerospace Research Institute (KARI).

European Aviation Safety Agency, "Decision No. 2003/12/RM". Nov. 5, 2003. Available at: https://www.easa.europa.eu/en/document-library/agency-decisions/ed-decision-2003-012-rm (136 pages).

Does Number of Blades on an Airplane Propeller Make a Difference? Apr. 26, 2014. Available at: https://howthingsfly.si.edu/ask-an-explainer/does-number-blades-airplane-propeller-make-difference (2 pages).

Fast-Forwarding to a Future of On-Demand Urban Air Transportation (Uber Elevate White Paper). Uber Technologies, Inc. Oct. 27, 2016. Available at: https://evtol.news/_media/PDFs/UberElevateWhitePaperOct2016.pdf (98 pages).

Geometry Design and Performance Analysis of Electric-Powered Vertical Takeoff and Landing Personal Aircraft. Nov. 2019. Available at: https://www.dbpia.co.kr/journal/articleDetail?nodeId=NODE09318033. Proceedings of the Korean Society for Aeronautical and Space Sciences 2019 Fall Conference.

Johnson, "Helicopter Theory". 1980. Princeton, NJ: Princeton University Press, pp. 3-4, 318-321, 956-957.

Holder and Markman, "Straight Up: A History of Vertical Flight," Chapter 4: Tilt-Thrust Systems. Nov. 27, 2000, pp. 38, 53, 57, 58, 67.

How Does a Tiltrotor Yaw While in Vertical Flight? Aviation Stack Exchange. Oct. 1, 2016. Available at: https://aviation.stackexchange.com/questions/31947/how-does-a-tiltrotor-yaw-while-in-vertical-flight (2 pages).

Kari Oppav (prototype). Jan. 1, 2024. Available at: https://web.archive.org/web/20240101205754/https://evtol.news/karioppav-prototype (3 pages).

Lockheed C-130J (3-View Drawing). Nov. 28, 2019. Available at: https://commons.wikimedia.org/wiki/File:Lockheed_C-130J_Hercules_3-view_drawing.svg (1 page).

Public-Private Joint Venture for Development of Personal Air Vehicle and Revitalization of Transportation Industry. Sep. 3, 2019. Available at: https://m.molit.go.kr/viewer/skin/doc.html?fn=d6accaf810dbeldb0862f49dfc2cd258&rs=/viewer/result/20190903.

Pusher Configuration. Apr. 12, 2020. Available at: https://web.archive.org/web/20200412001644/https://en.wikipedia.org/wiki/Pusher_configuration#Disadvantages (4 pages).

Tractor Configuration. Feb. 27, 2020. Available at: https://web.archive.org/web/20200227215106/https://en.wikipedia.org/wiki/Tractor_configuration (1 page).

Wing Configuration. Wikipedia. Feb. 19, 2020. Available at: https://web.archive.org/web/20200219042336/https://en.wikipedia.org/wiki/Wing_configuration (14 pages).

Rosenstein and Clark, "Aerodynamic Development of the V-22 Tilt Rotor". Paper No. 14, Twelfth European Rotorcraft Forum, Garmisch-Partenkirchen, Germany, Sep. 22-25, 1986. Available at: https://dspace-erf.nlr.nl/server/api/core/bitstreams/516e61e3-a86b-451e-a005-be5622a4f65b/content (27 pages).

VTBIRD VTOL 3 Minutes Design Explanations. May 2, 2020. Available at: https://www.youtube.com/watch?v=jd04QeJcwRY (1 page).

Uber Elevate eCRMs. Sep. 1, 2019. Available at: https://evtol.news/uber-elevate-ecrm-001/, https://evtol.news/uber-elevate-ecrm-002/, https://evtol.news/uber-elevate-ecrm-003/, https://evtol.news/uber-elevate-ecrm-004/ (4 pages).

Tilt Rotor Aeroacoustic Model Project. Jun. 1999. Available at: https://rotorcraft.arc.nasa.gov/Publications/files/Johnson_CEAS99.pdf (22 pages).

Tilt Rotor Planes—Plane Documentation. Nov. 18, 2019. Available at: https://web.archive.org/web/20191118123000/http://ardupilot.org/plane/docs/guide-tilt-rotor.html (4 pages).

Tiltrotor. Wikipedia. Apr. 15, 2020. Available at: https://web.archive.org/web/20200415003449/https://en.wikipedia.org/wiki/Tiltrotor (7 pages).

* cited by examiner

VERTICAL TAKE-OFF AND LANDING AIRCRAFT

CROSS-REFERENCE TO RELATED APPLICATIONS

This application is a continuation of U.S. Nonprovisional Application No. 17/955,103, filed Sep. 28, 2022, which is a continuation of U.S. Nonprovisional application Ser. No. 16/878,380, filed May 19, 2020, and both the entire contents of which are incorporated herein by reference in their entireties.

FIELD

This disclosure generally relates to vertical take-off and landing aircraft, and more specifically to fixed wing vertical take-off and landing aircraft.

BACKGROUND

Vertical take-off and landing (VTOL) aircraft are aircraft that can take-off and land vertically and hover, providing the ability to carry travelers directly to their destination. Helicopters are VTOL aircraft that generate lift entirely through their rotors. Some VTOL aircraft have wings and propulsion systems that enable the wings to provide the lift required during forward flight. Some winged VTOL aircraft use separate propulsion systems for vertical thrust for use during take-off and landing and forward thrust for use during cruising. Other winged VTOL aircraft use tiltable propulsion systems that tilt between vertical thrust and forward thrust positions.

SUMMARY

According to various embodiments, a vertical take-off and landing aircraft includes a fixed wing, a plurality of rotors for providing lift during vertical take-off and landing, and a plurality of proprotors that can tilt from lift configurations for providing lift during vertical take-off and landing to propulsion configurations for providing the forward air speed required for the aircraft to be supported by the fixed wing. By configuring the VTOL aircraft so that a portion of the propulsion system is dedicated to lift and a portion of the propulsion system is used during both lift and forward flight, the aircraft can be lighter and have lower drag than VTOL aircraft that have separate lift and propulsion systems and VTOL aircraft that use all propulsion for both lift and forward flight.

A vertical take-off and landing aircraft includes a fuselage; at least one wing connected to the fuselage; a plurality of rotors connected to the at least one wing for providing lift for vertical take-off and landing of the aircraft; and a plurality of proprotors connected to the at least one wing and tiltable between lift configurations for providing lift for vertical take-off and landing of the aircraft and propulsion configurations for providing forward thrust to the aircraft.

In any of these embodiments, the plurality of rotors can be rearward of the at least one wing and the plurality of proprotors can be forward of the at least one wing. In any of these embodiments, a plurality of booms can be mounted to the at least one wing, each boom mounting one rotor and one proprotor to the at least one wing.

In any of these embodiments, a first proprotor can be forward of a second proprotor that is adjacent to the first proprotor.

In any of these embodiments, a first proprotor can be mounted at a higher position on the aircraft than a second proprotor that is adjacent to the first proprotor.

In any of these embodiments, each rotor can have only two blades. In any of these embodiments, each rotor can be configured to fix the two blades in position during forward flight. In any of these embodiments, each proprotor can have greater than two blades.

In any of these embodiments, a first rotor of the plurality of rotors can be canted relative to a second rotor of the plurality of rotors such that a rotational axis of the first rotor is non-parallel with a rotational axis of the second rotor. In any of these embodiments, a cant angle of any rotor or proprotor is such that a respective burst disc cannot intersect with passengers or a pilot. In any of these embodiments, a cant angle of any rotor or proprotor is such that a respective burst disc cannot intersect with any flight-critical component.

In any of these embodiments, a first proprotor of the plurality of proprotors can be canted relative to a second proprotor of the plurality of proprotors such that a rotational axis of the first proprotor is non-parallel with a rotational axis of the second proprotor.

In any of these embodiments, the aircraft further includes a control system configured to actively alter a tilt of at least one proprotor to generate yawing moments during hover.

In any of these embodiments, attack angles of blades of the proprotors can be collectively adjustable during flight.

In any of these embodiments, propulsion can be provided entirely by the proprotors.

In any of these embodiments, a range of tilt of the proprotors can be greater than ninety degrees.

In any of these embodiments, the at least one wing can provide the lift required during cruising.

In any of these embodiments, the at least one wing can be a high wing mounted to an upper side of the fuselage.

In any of these embodiments, the at least one wing has control surfaces.

In any of these embodiments, all of the rotors and proprotors are mounted to the at least one wing.

In any of these embodiments, the aircraft is electrically powered.

In any of these embodiments, the aircraft is manned.

BRIEF DESCRIPTION OF THE DRAWINGS

The invention will now be described, by way of example only, with reference to the accompanying drawings, in which.

DETAILED DESCRIPTION

Figure 1:
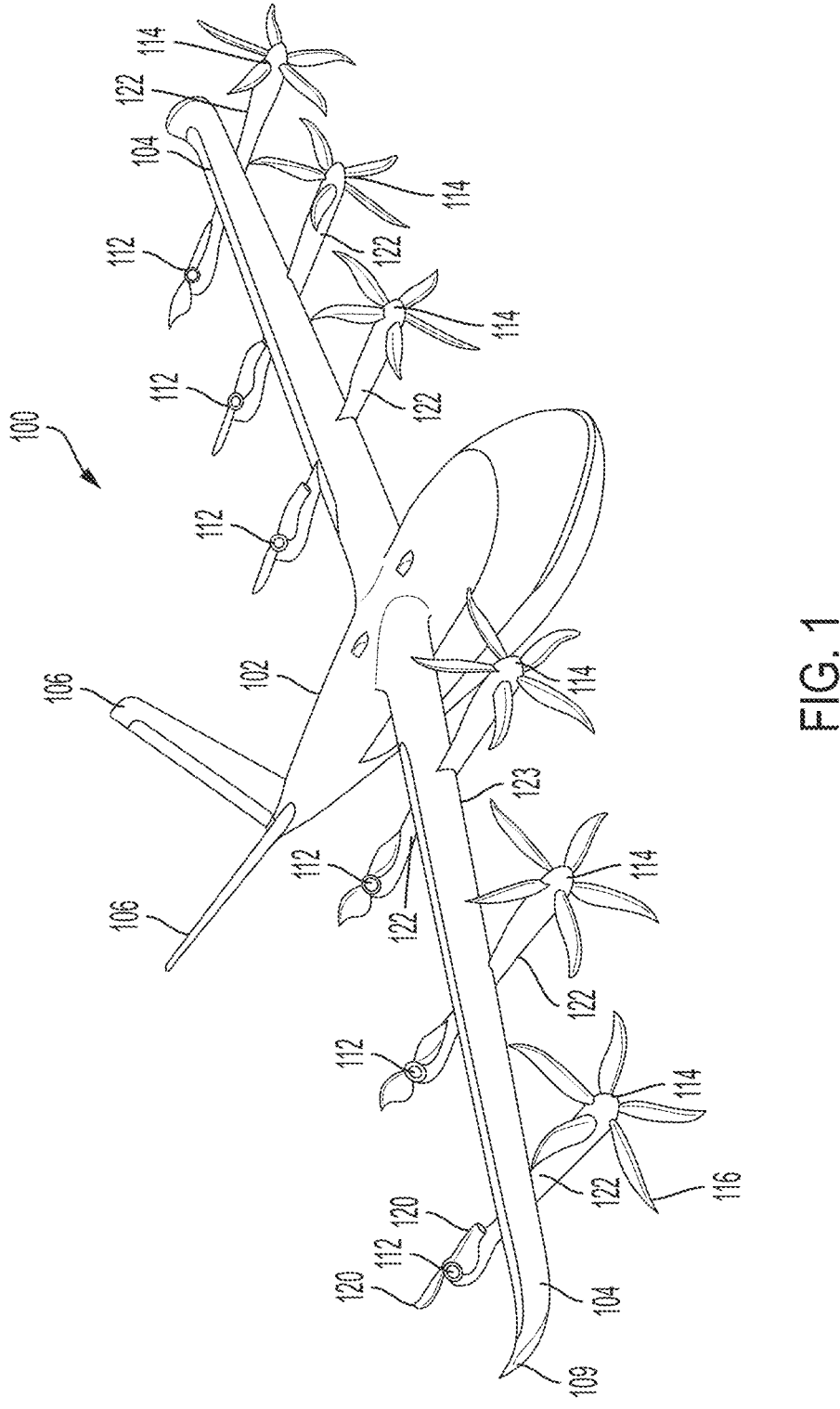
FIG. 1 shows a VTOL aircraft in a forward flight configuration, according to various embodiments.

According to various embodiments, VTOL aircraft described herein include at least one fixed wing, a plurality of rotors that are fixed for providing lift during take-off, landing, and hover, and a plurality of proprotors that are tiltable from lift configurations for providing lift to propulsion configurations for providing the forward thrust needed for the at least one fixed wing to provide the lift to the aircraft. By configuring the VTOL aircraft so that a portion of the propulsion system is dedicated to lift and a portion of the propulsion system is used during both lift and forward flight, the aircraft can be lighter and have lower drag than VTOL aircraft that have separate lift and propulsion systems and VTOL aircraft that use all propulsion for both lift and forward flight. Winged VTOL aircraft that have separate propulsion systems for vertical propulsion and forward propulsion essentially waste the forward propulsion system during vertical take-off and landing and hover. In contrast, aircraft according to the principles described herein utilize the forward propulsion system during vertical take-off and landing, which can results in a relatively light propulsion system overall. Winged VTOL aircraft that tilt all of their rotors have limited places to position the rotors (rotors must be positioned forward and rearward of the center of gravity but their positioning is limited by the other rotors and the wings), which often results in relatively fewer, and therefore larger, rotors. In contrast, propulsion systems according to the principles described herein can be have relatively smaller, lighter weight, and lower drag rotors. Thus, aircraft according to various embodiments described here have an ideal balance between a dedicated lift propulsion system and a tiltable propulsion system.

According to various embodiments, the proprotors are mounted to wing(s), forward of the leading edge, and the rotors are mounted to the wing(s), rearward of the trailing edge. The proprotors and rotors can be mounted to the wings via booms. In some embodiments each boom supports a proprotor at its front end and a rotor at its rear end.

According to various embodiments, the proprotors are staggered in the forward and rearward direction to prevent broken blades of one proprotor from hitting the blades of the adjacent proprotor. According to some embodiments, the rotors and/or proprotors are positioned and canted so that their blades do not intersect one another and to enhance yaw control authority. In some embodiments, the rotors and/or proprotors are positioned and canted so that the planes of rotation of their blades do not intersect passengers and/or critical system components to minimize the potential damage resulting from a blade breaking during flight.

According to some embodiments, the wings are located high on the fuselage for easy passenger ingress and egress. The aircraft can be configured so that the bottom of the booms supporting the rotor and proprotors are above the head of an average sized person, which also contributed to ease of ingress and egress.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well, unless the context clearly indicates otherwise. It is also to be understood that the term "and/or," as used herein, refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units, but do not preclude the presence or addition of one or more other features, integers, steps, operations, elements, components, units, and/or groups thereof.

As used herein, the term "proprotor" refers to a variable pitch propeller that can provide thrust for vertical lift and for forward propulsion by varying the pitch of the propeller.

Figure 2:
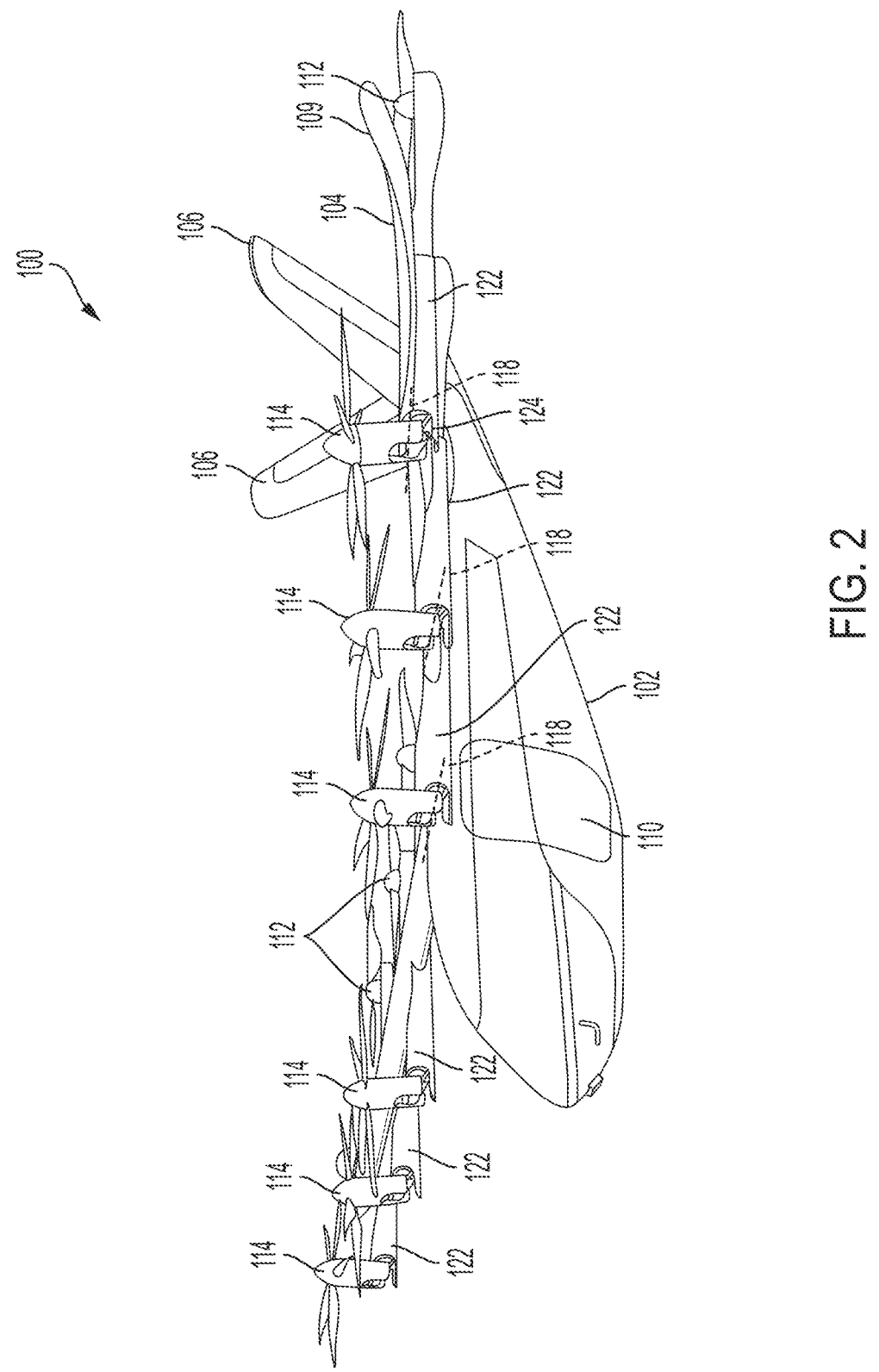
FIG. 2 shows a VTOL aircraft in a takeoff and landing configuration, according to various embodiments.

FIGS. 1 and 2 illustrate a VTOL aircraft 100 in a cruise configuration and a vertical take-off and landing configuration, respectively, according to various embodiments. The aircraft 100 includes a fuselage 102, wings 104 mounted to the fuselage 102, and one or more rear stabilizers 106 mounted to the rear of the fuselage 102. A plurality of rotors 112 are mounted to the wings 104 and are configured to provide lift for vertical take-off and landing. A plurality of proprotors 114 are mounted to the wings 104 and are tiltable between lift configurations in which they provide a portion of the lift required for vertical take-off and landing and hovering, as shown in FIG. 2, and propulsion configurations in which they provide forward thrust to the aircraft 100 for horizontal flight, as shown in FIG. 1. As used herein, a proprotor lift configuration refers to any proprotor orientation in which the proprotor thrust is providing primarily lift to the aircraft and proprotor propulsion configuration refers to any proprotor orientation in which the proprotor thrust is providing primarily forward thrust to the aircraft.

According to various embodiments, the rotors 112 are configured for providing lift only, with all propulsion being provided be the proprotors. Accordingly, the rotors 112 may be in fixed positions. During take-off and landing, the proprotors 114 are tilted to lift configurations in which their thrust is directed downwardly for providing additional lift.

For forward flight, the proprotors 114 tilt from their lift configurations to their propulsion configurations. In other words, the pitch of the proprotors 114 is varied from a pitch in which the proprotor thrust is directed downward to provide lift during vertical take-off and landing and during hover to a pitch in which the proprotor thrust is directed rearward to provide forward thrust to the aircraft 100. The proprotors tilt about axes 118 that are perpendicular to the forward direction of the aircraft 100. When the aircraft 100 is in full forward flight, lift may be provided entirely by the wings 104, and the rotors 112 may be shut-off. The blades 120 of the rotors 112 may be locked in low drags positions for aircraft cruising. In some embodiments, the rotors 112 each have two blades 120 that are locked for cruising in minimum drag positions in which one blade is directly in front of the other blade as illustrated in FIG. 1. In some embodiments, the rotors 112 have more than two blades. In some embodiments, the proprotors 114 include more blades 116 than the rotors 112. For example, as illustrated in FIGS. 1 and 2, the rotors 112 may each include two blades and the proprotors 114 may each include five blades. According to various embodiments, the proprotors 114 can have from 2 to 5 blades.

According to various embodiments, the aircraft includes only one wing 104 on each side of the fuselage 102 (or a single wing that extends across the entire aircraft) and at least a portion of the rotors 112 are located rearward of the wings 104 and at least a portion of the proprotors 114 are located forward of the wings 104. In some embodiments, all of the rotors 112 are located rearward of the wings 104 and all of the proprotors are located forward of the wings 104. According to some embodiments, all rotors 112 and proprotors 114 are mounted to the wings—i.e., no rotors or proprotors are mounted to the fuselage. According to various embodiments, the rotors 112 are all located rearwardly of the wings 104 and the proprotors 114 are all located forward of the wings 104. According to some embodiments, all rotors 112 and proprotors 114 are positioned inwardly of the wing tips 109.

According to various embodiments, the rotors 112 and proprotors 114 are mounted to the wings 104 by booms 122. The booms 122 may be mounted beneath the wings 104, on top of the wings, and/or may be integrated into the wing profile. According to various embodiments, one rotor 112 and one proprotor 114 are mounted to each boom 122. The rotor 112 may be mounted at a rear end of the boom 122 and a proprotor 114 may be mounted at a front end of the boom 122. In some embodiments, the rotor 112 is mounted in a fixed position on the boom 122. In some embodiments, the proprotor 114 is mounted to a front end of the boom 122 via a hinge 124. The proprotor 114 may be mounted to the boom 122 such that the proprotor 114 is aligned with the body of the boom 122 when in its propulsion configuration, forming a continuous extension of the front end of the boom 122 that minimizes drag for forward flight.

According to various embodiments, the aircraft 100 may include only one wing on each side of the aircraft 100 or a single wing that extends across the aircraft. According to some embodiments, the at least one wing 104 is a high wing mounted to an upper side of the fuselage 102. According to some embodiments, the wings include control surfaces, such as flaps and/or ailerons. According to some embodiments, the wings can have curved wing tips 109 for reduced drag during forward flight.

Figure 3:
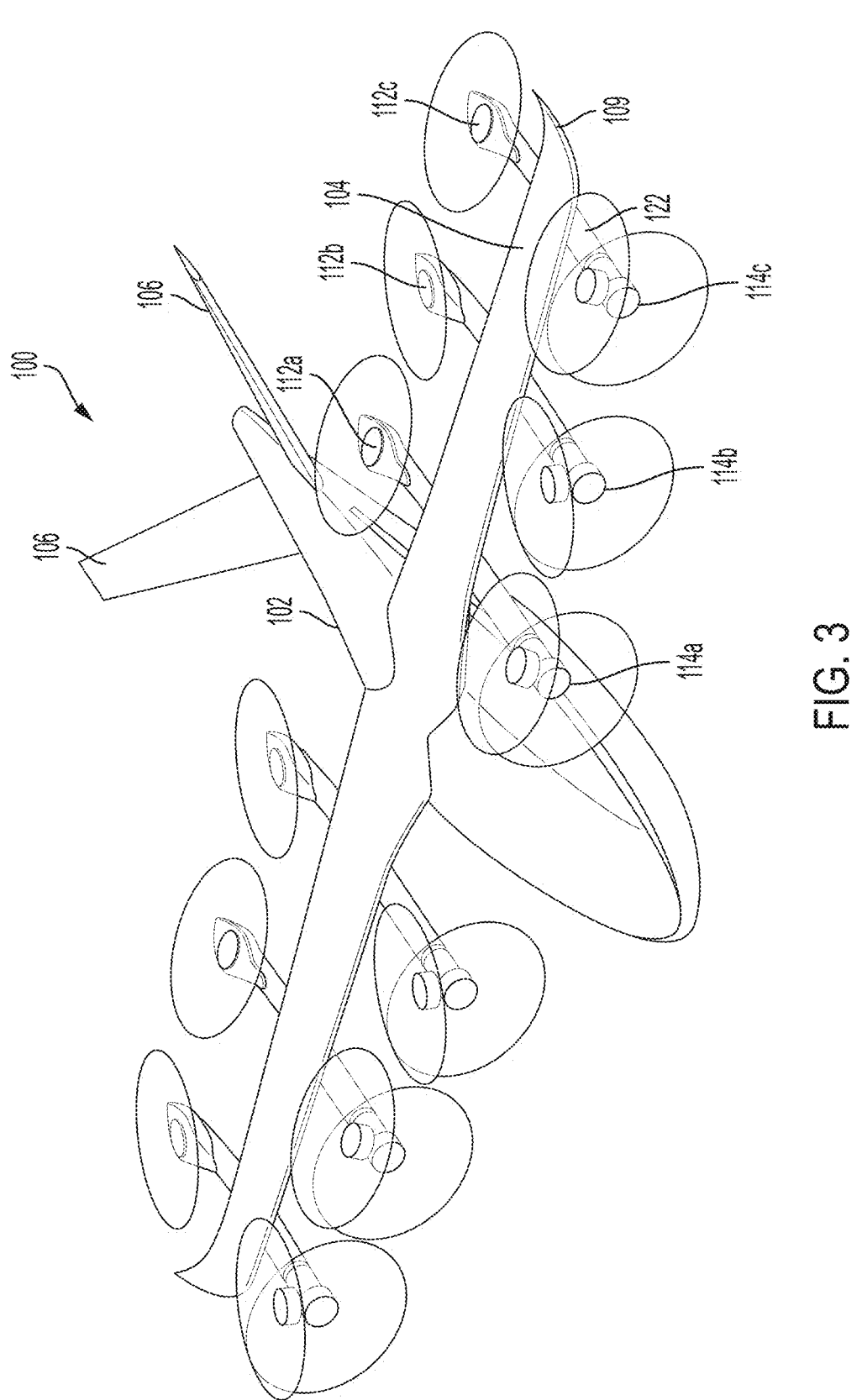
FIG. 3 is a perspective view of a VTOL aircraft illustrating the rotor and proprotor positions in the lift and forward flight configurations, according to various embodiments.

According to some embodiments, the rear stabilizers 106 include control surfaces, such as one or more rudders, one or more elevators, and/or one or more combined rudder-elevators. The wing(s) may have any suitable design. In some embodiments, the wings have a tapering leading edge 123, as shown for example, in the embodiment of FIG. 1. In some embodiments, the wings have a tapering trailing edge 125 as shown in the embodiment of FIG. 3. In the embodiment of FIG. 3, the wings have a substantially straight leading edge 127 in the central section of the wings 104.

Aircraft 100 may include at least one door 110 for passenger entry and exit. In the illustrated embodiment, the door 110 is located beneath and forward of the wings 104.

According to various embodiments, the rotors 112 and proprotors 114 are positioned and configured to minimize the damage that may occur due to blade failure (commonly referred to as rotor burst). FIG. 3-6 show the relative locations and orientations of the rotor and proprotor blades during use, according to some embodiments. The blade positions over full rotations are illustrated by discs. The proprotors each have two discs—one for the lift configuration and one for the propulsion configuration. The rotor and proprotor configurations on the left and right of the aircraft are mirror images, and therefore, the configurations of the rotors and proprotors of only one side of the aircraft are discussed below.

Figure 4:
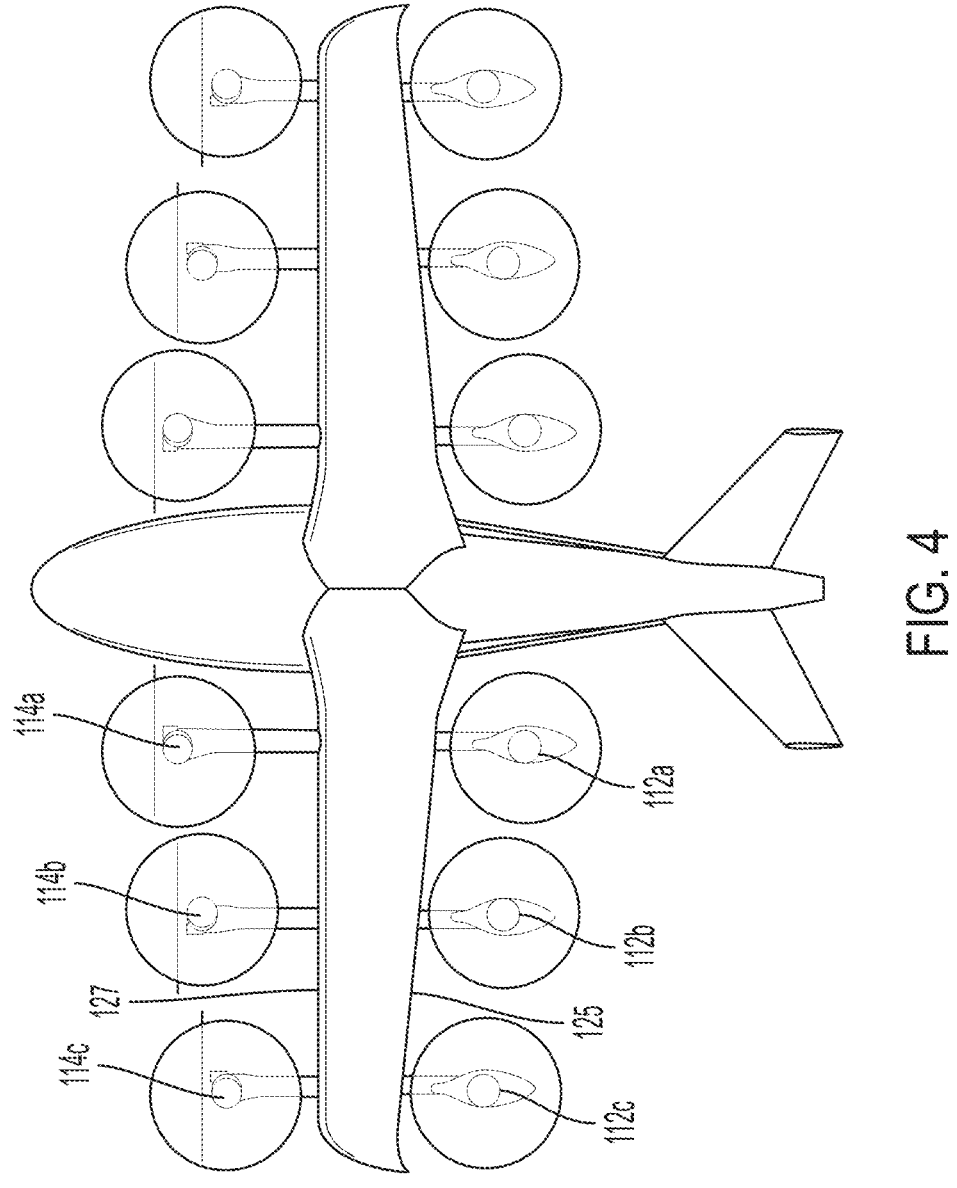
FIG. 4 is a top view of the VTOL aircraft of FIG. 3.
Figure 5:
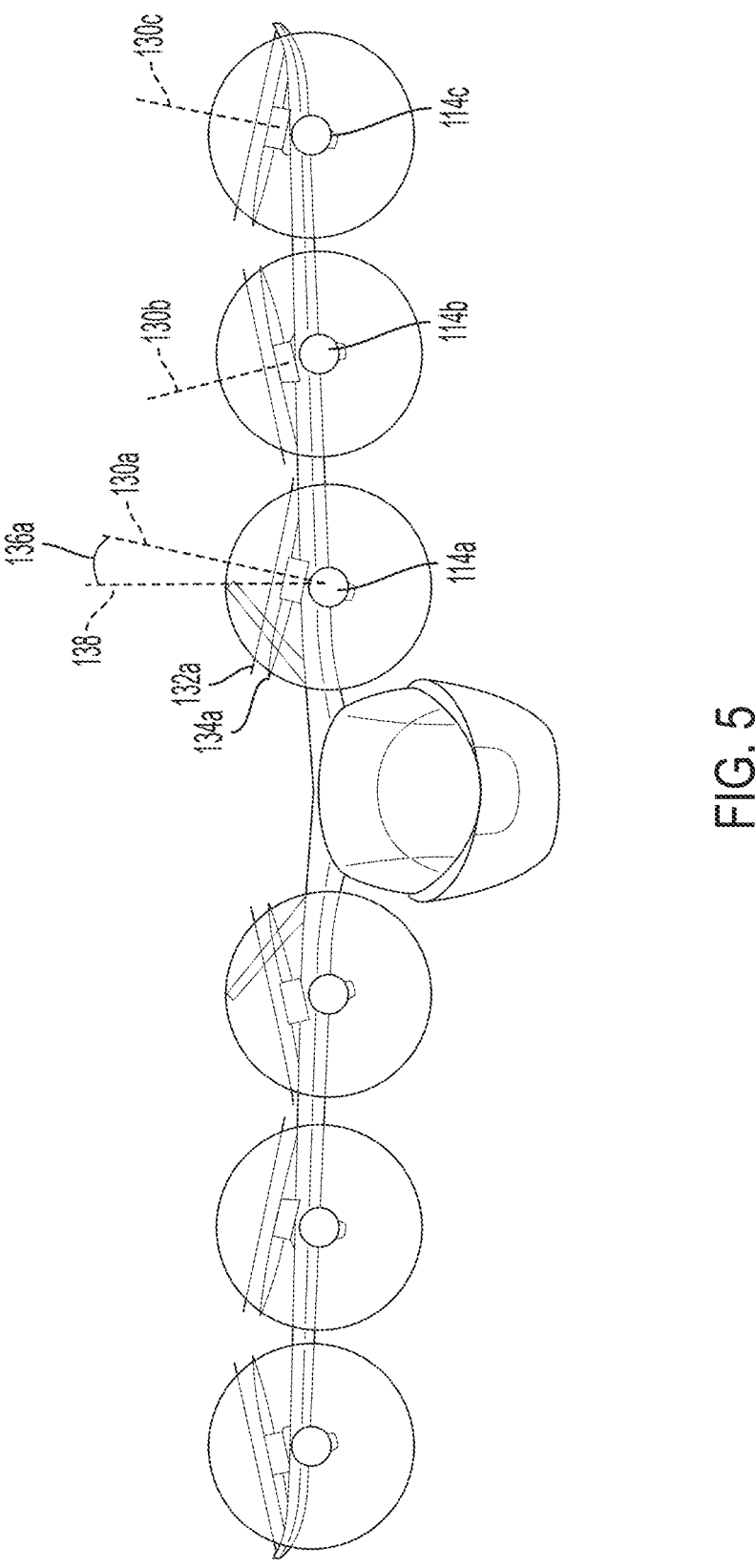
FIG. 5 is a front view of the VTOL aircraft of FIG. 3.

As illustrated in the top view of FIG. 4, the proprotors 114 may be staggered in the forward-rearward direction such that the plane of rotation of the proprotors in their propulsion configurations are non-coplanar. In the illustrated embodiments, the innermost proprotor 114a is forward of the other proprotors. In some embodiments, the innermost proprotors 114a are forward of the passenger compartment or the forward-most location of passengers in the passenger compartment to ensure that a broken blade cannot enter the passenger compartment and injure a passenger. In some embodiments, at least two proprotors on the same side of the aircraft are aligned such that their blade rotation planes are coplanar.

According to some embodiments, the rotors 112 are in staggered forward-rearward positions. In some embodiments, the innermost rotors 112a are positioned rearward of the other rotors. In some embodiments, at least a portion of the rotors 112 are aligned in the forward rearward direction.

According to some embodiments, at least one of the rotors 112 and/or proprotors 114 is canted relative to at least one other rotor 112 and/or proprotor 114. As used herein, canting refers to a relative orientation of the rotational axis of the rotor/proprotor about a line that is parallel to the forward-rearward direction, analogous to the roll degree of freedom of the aircraft. Canting of the rotors and/or proprotors can help minimize damage from rotor burst by orienting the rotational plane of the rotor/proprotor discs (the blades plus the rotor portion onto which the blades are mounted) so as to not intersect critical portions of the aircraft (such areas of the fuselage in which people may be positioned, critical flight control systems, batteries, adjacent rotors/proprotors, etc.) or other rotor discs and may provide enhanced yaw control during flight. In some embodiments, a cant angle of any rotor or proprotor is such that a respective burst disc will not intersect with passengers or a pilot. In some embodiments, a cant angle of any rotor or proprotor is such that a respective burst disc will not intersect with any flight-critical component. (As used herein, a critical component is any component whose failure would contribute to or cause a failure condition that would prevent the continued controlled flight and landing of the aircraft.) The front view of FIG. 5 best illustrates the canting of the rotors and proprotors, according to some embodiments. A rotation axis 130a for the innermost proprotor 114a in its lift configuration is provided to illustrate the cant angle of the proprotor 114a. The canting of the proprotors 114 results in the rotation planes of their blades being angled relative to horizontal, as illustrated, for example, by disc 132a being non-horizontal. The illustrated cant angle 136a measured from vertical 138 is about 12 degrees, but can range from 0 to 30 degrees in either direction. In the illustrated embodiment, the outermost proprotor 114c is canted the same amount and in the same direction as the innermost proprotor 114a and the middle proprotor 114b is canted by the same amount but in the opposite direction as the innermost and outermost proprotors 114a,c such that the rotational axis 130a of proprotor 114a is parallel to the rotational axis of the rotational axis 130c of proprotor 114c but non-parallel to the rotational axis 130b of proprotor 114b. However, this is merely one example of the relative canting of the proprotors and it will be understood to a person of skill in the art that any suitable combination of proprotor canting (inclusive of no canting) may be used according to the desired performance characteristics of the aircraft.

The rotors 112 may also be canted in any suitable manner and combination. In some embodiments, the rotors 112 are canted according to a corresponding proprotor. For example, innermost rotor 112a is canted by the same amount and in the same direction as the innermost proprotor 114a as can be seen by comparing the innermost rotor blade disc 134a to the innermost proprotor blade disc 132a. Similarly, rotor 112b and 112c are canted similarly to the corresponding proprotor 114b and 114c, respectively. Note that in FIG. 5, the innermost rotor blade disc 134a is not depicted as a straight line due to the innermost rotor 112a being oriented with a rearward tilt as discussed further below. Any suitable combination of canting and/or non-canting of the rotors relative to one another and relative to the proprotors can be used to achieve desired performance characteristics.

Figure 6:
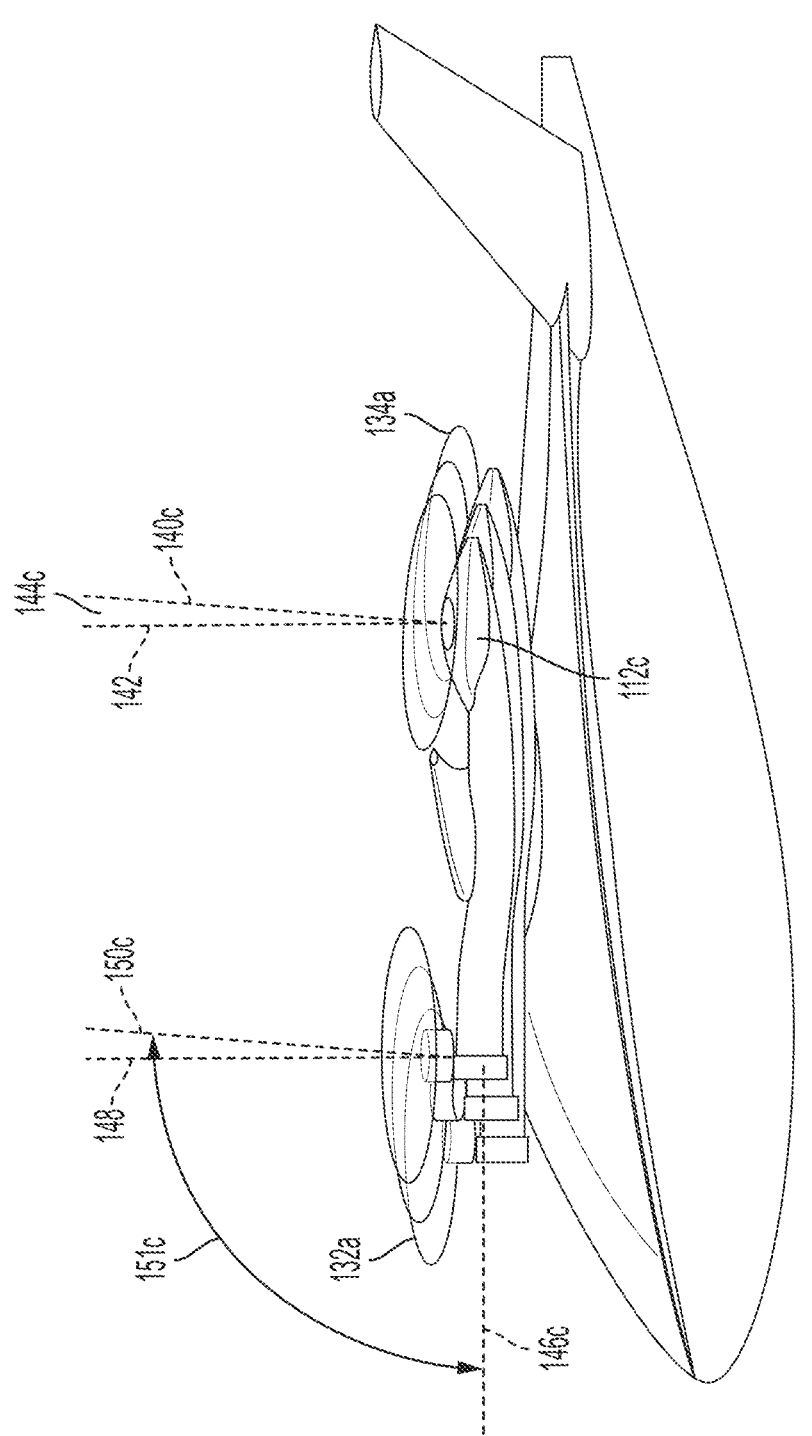
FIG. 6 is a side view of the VTOL aircraft of FIG. 3.

The side view of FIG. 6 illustrates the relatively small rearward tilt of the outermost rotor 112c, according to the illustrated embodiment. The rotational axis 140c of the rotor 112c is tilted rearward from vertical 142 by an angle 144c, which can range from 0 to 15 degrees in either direction. The slight rearward tilt of the rotor 112c can help with aircraft stability and yaw control. FIG. 6 also illustrates the range of tilt at least the outermost proprotor 114c, according to some embodiments. The outermost proprotor 114c can tilt from a straight-ahead position illustrated by the horizontal rotational axis 146c of the proprotor 114c in its propulsion configuration to a position just past (for example, less than 10 degrees past) vertical 148 as illustrated by rotational axis 150c of the proprotor 114c in its lift configuration, such that the proprotor 114c has a range of tilt 151c of about 100 degrees. According to various embodiments, each of the proprotors 114 has a range of greater than 90 degrees.

Figure 7:
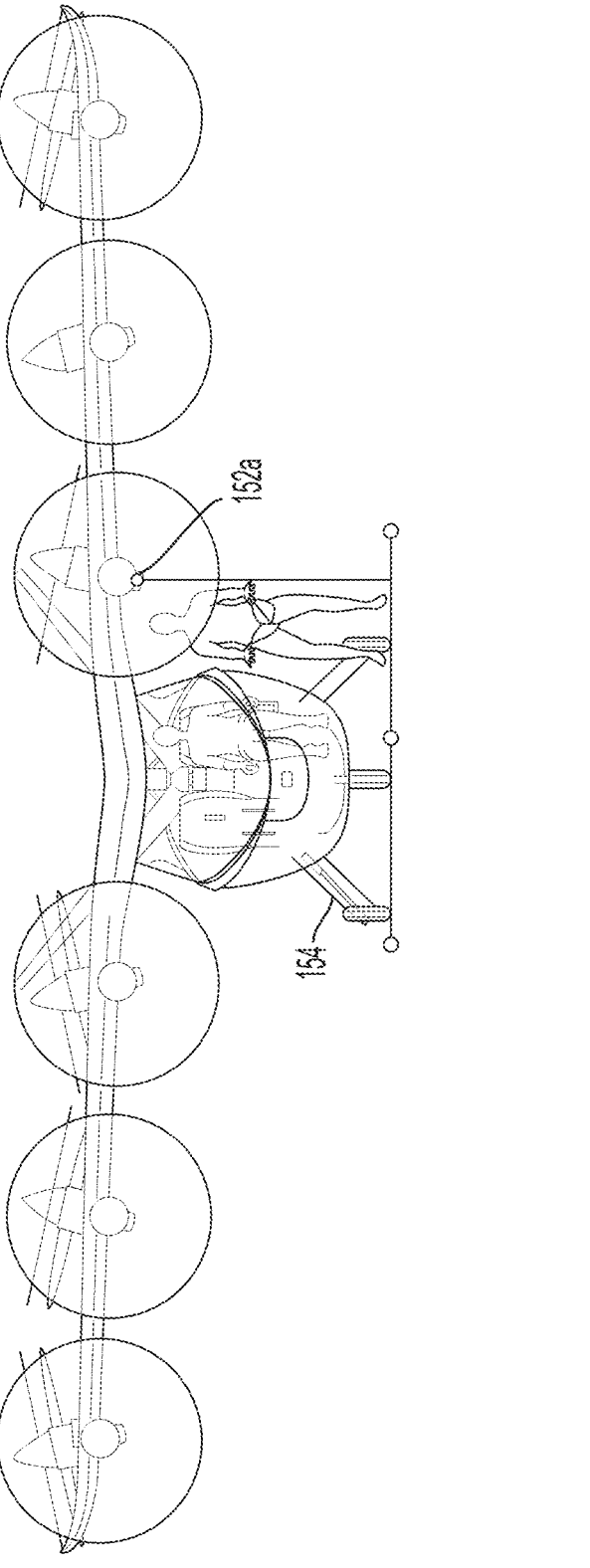
FIGS. 7 and 8 are front and side views, respectively, of a VTOL aircraft illustrating the size of the aircraft relative to a standing person, according to various embodiments.
Figure 8:
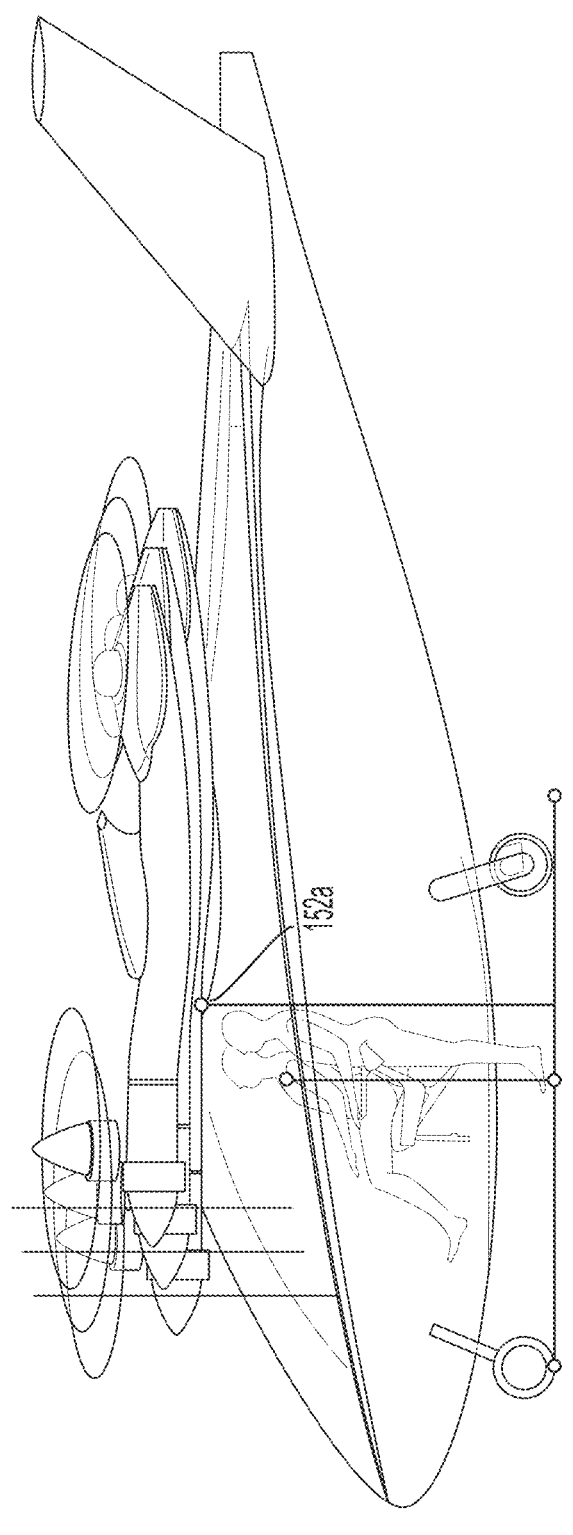

FIGS. 7 and 8 illustrate the locations of the wings, rotors, and proprotors relative to a person on the ground, according to some embodiments. The aircraft 100 may be configured so that the bottom 152a of the innermost proprotor 114a is located above the head of a person standing on the ground next to the fuselage (for example, preparing to enter the aircraft) when the aircraft 100 is supported by its landing gear 154 on the ground. Locating the wings in high positions on the upper portion of the fuselage 102 can ensure maximum head room for people entering and exiting the aircraft. FIGS. 7 and 8 also show a person sitting in the cabin of the fuselage to illustrate the relative size of the aircraft, according to some embodiments.

According to some embodiments, the rotors 112 and proprotors 114 are all electrically powered. Batteries for powering the rotors 112 and proprotors 114 can be located in any suitable locations of the aircraft, including in the fuselage and/or the wings. The number and power of the rotors and proprotors can be selected according to the desired performance parameters (e.g., target payload, airspeed, and altitude). According to some embodiments, the maximum power rating of one or more of the rotors and proprotors is 500 kilowatts or less, preferably 200 kilowatts or less, more preferably 150 kilowatts or less. According to some embodiments, the maximum power rating of one or more of the rotors and proprotors is at least 10 kilowatts, preferably at least 20 kilowatts, more preferably, at least 50 kilowatts. The number of proprotors can range from as little as 2 (one on each side of the aircraft) to a maximum of 24 (12 on each side of the aircraft). Preferably, the number of proprotors is in the range of 4 to 8. The number of rotors can range from 2 to 24, and is preferably in the range of 4 to 8. The aircraft can have an equal number of rotors and proprotors, a greater number of proprotors, or a greater number of rotors.

Aircraft according to the principles discussed above can be configured to carry up to 10 people, preferably up to 6 people, and more preferably up to 4 people. According to some embodiments, the aircraft is configured to be piloted and includes piloting controls. In some embodiments, the aircraft is configured to operate autonomously without any onboard pilot.

According to some embodiments, the aircraft is configured to carry up to 6 people (for example, a pilot and up to 5 passengers) up to 75 miles at a cruising speed of up to 150 miles per hour at an altitude of up to 3,000 feet above ground. In some embodiments, the aircraft is configured for 5 people, such as one pilot and four passengers. According to various embodiments, the maximum range on a single battery charge is 25 miles, 50 miles, 75 miles, 100 miles, or 200 miles.

According to various embodiments, the rotors 112 and/or proprotors 114 are configured to have relatively low tip speed to decrease the amount of noise generated by the aircraft. In some embodiments, the tip speed of the rotor blades is about 0.4 Mach in hover. According to various embodiments, the diameter of the rotor and/or proprotor blades is the range of 1 to 5 meters, preferably in the range of 1.5 to 2 meters.

According to various embodiments, the wingspan is in the range of 10 to 20 meters, preferably in the range of 15 to 16 meters. According to various embodiments, the length of the aircraft is in the range of 3 to 20 meters, preferably in the range of 5 to 15 meters, more preferably in the range of 6 to 10 meters.

According to various embodiments, the aircraft is operated during take-off and landing by positioning the proprotors in lift configurations and providing the required lift to the aircraft via the combined lift provided by the rotors and proprotors. According to various embodiments, during vertical take-off and landing and/or hover, the proprotors can be maintained in predetermined lift configurations that can be the same across all proprotors or different for different proprotors. According to various embodiments, the tilt of at least some of the proprotors can be actively adjusted during take-off and landing and/or hover to provide the required stability and/or maneuvering. According to some embodiments, the tilt of at least one proprotor is actively controlled by the flight controller during take-off, landing, and/or hover to generate yawing moments.

According to various embodiments, each rotor and/or each proprotor can be individually controlled by the flight controller according to the various operational degrees of freedom. According to various embodiments, the only degree of freedom of the rotor is the rotational speed of the rotor. In some embodiments, the angle of attack of the blades of the rotors can be collectively adjusted, providing an additional degree of freedom. According to various embodiments, the degrees of freedom of at least a portion of the proprotors includes the rotational speed of the proprotors, the collective attack angle of the blades, and the degree of tilt of the proprotors. According to various embodiments, any of these degrees of freedom can be actively controlled by the flight controller (either autonomously or in response to pilot commands) during take-off and landing in order to provide the appropriate stability and maneuvering.

Once the aircraft has achieved sufficient altitude to commence forward flight, the proprotors begin tilting forward toward their propulsion configurations such that their thrust provides a combination of lift and thrust, with a decreasing proportion of lift as the proprotors are tilted further toward their propulsion configurations. The rotors can remain active during at least a portion of the period in which the proprotors are tilted forward to continue to provide rotor-based lift. At any point after the forward airspeed is high enough that the wings provides sufficient lift to maintain the aircraft's altitude, the rotors can be deactivated. As discussed above, the rotor blades can be locked in a low-drag position.

During cruising, the rotors remain deactivated. The control surfaces of the wings and/or rear stabilizers can be used for aircraft maneuvering and stability in a conventional manner. According to some embodiments, the tilt of at least some of the proprotors can be actively controlled to provide additional stability and/or maneuverability control. In some embodiments, the tilt of at least some of the proprotors is actively controlled during take-off and landing and/or hover. In some embodiments, the tilt of the proprotors is fixed (i.e., non-varying) during cruise. According to some embodiments, the tilt of the outermost proprotors can be actively and independently controlled during vertical take-off and landing and/or hover to provide yawing moments as needed.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. An aircraft, comprising:
a fuselage;
a single pair of wings connected to the fuselage or a single wing extending across the fuselage;
a plurality of rotors connected to the single wing or single pair of wings for providing lift for vertical take-off and landing of the aircraft, wherein the plurality of rotors is four rotors, wherein the plurality of rotors comprises a first outermost rotor on a first side of the fuselage, a second outermost rotor on a second side of the fuselage, a first innermost rotor on the first side of the fuselage, and a second innermost rotor on the second side of the fuselage, wherein each rotor of the plurality of rotors is fixed in position; and
a plurality of proprotors connected to the single wing or single pair of wings and tiltable between lift configurations for providing lift for vertical take-off and landing of the aircraft and propulsion configurations for providing forward thrust to the aircraft, wherein the plurality of proprotors is four proprotors;
wherein each rotor comprises more than two blades,
each rotor of the plurality of rotors has a rotational axis that is tilted rearward relative to a vertical axis of the aircraft;
the rotational axis of the first outermost rotor is tilted rearward at a first fixed tilt angle relative to the vertical axis of the aircraft,
the rotational axis of the second outermost rotor is tilted rearward at a second fixed tilt angle relative to the vertical axis of the aircraft,
the first and second fixed tilt angles are greater than 0 degrees and less than or equal to 15 degrees,
wherein the aircraft is a piloted vertical take-off and landing electric aircraft, and
wherein each of a first innermost proprotor, a first outermost proprotor, a second innermost proprotor, and a second outermost proprotor of the plurality of proprotors is canted away from the fuselage.

2. The aircraft of claim 1, wherein the plurality of rotors are rearward of the single wing or single pair of wings and the plurality of proprotors are forward of the single wing or single pair of wings.

3. The aircraft of claim 1, comprising a plurality of booms mounted to the single wing or single pair of wings, wherein the plurality of rotors and the plurality of proprotors are connected to the single wing or single pair of wings via the plurality of booms;
each boom mounting one rotor of the plurality of rotors and one proprotor of the plurality of proprotors to the single wing or single pair of wings.

4. The aircraft of claim 3, wherein each boom of the plurality of booms is configured such that a first minimum distance in a direction along a length of the respective boom between a blade tip of the one proprotor and a leading edge of the single wing or single pair of wings is greater than a second minimum distance in the direction along the length of the respective boom between a blade tip of the one rotor and a trailing edge of the single wing or single pair of wings.

5. The aircraft of claim 3, wherein:
the first innermost rotor of the plurality of rotors and the first innermost proprotor of the plurality of proprotors are mounted to a first boom of the plurality of booms on the first side of the fuselage; and
the first outermost rotor of the plurality of rotors and the first outermost proprotor of the plurality of proprotors are mounted to a second boom of the plurality of booms on the first side of the fuselage,
wherein:
the first boom is between the second boom and the fuselage;
the first innermost proprotor is forward of the first outermost proprotor, and
the first innermost rotor is rearward of the first outermost rotor.

6. The aircraft of claim 1, further comprising:
at least one battery configured to power the plurality of rotors and the plurality of proprotors, the at least one battery comprising a first battery located in the fuselage.

7. The aircraft of claim 1, further comprising:
at least one battery configured to power the plurality of rotors and the plurality of proprotors, the at least one battery comprising a first battery located in the single wing or single pair of wings.

8. The aircraft of claim 1, wherein the first innermost proprotor is forward of the first outermost proprotor.

9. The aircraft of claim 1, wherein each proprotor of the plurality of proprotors has more blades than each rotor.

10. The aircraft of claim 1, wherein the first outermost rotor of the plurality of rotors is canted relative to the second outermost rotor of the plurality of rotors such that the rotational axis of the first outermost rotor is non-parallel with the rotational axis of the second outermost rotor.

11. The aircraft of claim 10, wherein a rotor cant angle between the rotational axis of the first outermost rotor and the vertical axis of the aircraft is between 0 degrees and 30 degrees.

12. The aircraft of claim 11, wherein the rotor cant angle is about 12 degrees.

13. The aircraft of claim 1, wherein a proprotor cant angle between a rotational axis of the first outermost proprotor and the vertical axis of the aircraft is between 0 degrees and 30 degrees.

14. The aircraft of claim 13, wherein the proprotor cant angle is about 12 degrees.

15. The aircraft of claim 1, further comprising a control system configured to actively alter a tilt of at least one proprotor of the plurality of proprotors to generate yawing moments during take-off, landing and/or hover.

16. The aircraft of claim 1, wherein a range of tilt of the plurality of proprotors is greater than ninety degrees.

17. The aircraft of claim 1, wherein a range of tilt of the first outermost proprotor is about 100 degrees.

18. The aircraft of claim 1, wherein the first innermost proprotor and the first outermost proprotor are aligned such that their blade rotation planes are coplanar in the propulsion configuration.

19. The aircraft of claim 1, wherein the single wing or single pair of wings has a forward swept trailing edge.

20. The aircraft of claim 1, wherein the first fixed tilt angle is equal to the second fixed tilt angle.

21. The aircraft of claim 1, wherein each of the first innermost rotor, the first outermost rotor, the second innermost rotor, and the second outermost rotor is canted away from the fuselage.

22. The aircraft of claim 1, wherein each proprotor of the plurality of proprotors and each rotor of the plurality of rotors consists of four blades.

23. The aircraft of claim 1, wherein each proprotor of the plurality of proprotors and each rotor of the plurality of rotors has a same number of blades.

24. The aircraft of claim 1, wherein a blade diameter of the plurality of rotors or the plurality of proprotors is in a range of 1.5 to 2 meters.

25. The aircraft of claim 1, further comprising a v-tail, wherein each rotor of the plurality of rotors is forward of the v-tail.

26. The aircraft of claim 1, wherein each rotor of the plurality of rotors is configured to be locked in the propulsion configuration.

27. The aircraft of claim 1, wherein attack angles of blades of each proprotor of the plurality of proprotors are collectively adjustable during flight.

* * * * *